Jan. 9, 1923.

W. R. WOODS.
UNIVERSAL JOINT.
FILED SEPT. 3, 1921.

1,441,390.

Witnesses:
Wm. Schnellhardt
B. G. Richards

Inventor
Walter R. Woods
By Joshua R. H. Potts
His Attorney

Patented Jan. 9, 1923.

1,441,390

UNITED STATES PATENT OFFICE.

WALTER R. WOODS, OF LANSING, MICHIGAN, ASSIGNOR, BY MESNE ASSIGNMENTS, TO WILLIAM MUTSCHLER, TRUSTEE, OF GOSHEN, INDIANA.

UNIVERSAL JOINT.

Application filed September 3, 1921. Serial No. 498,380.

*To all whom it may concern:*

Be it known that I, WALTER R. WOODS, a citizen of the United States, and a resident of the city of Lansing, county of Ingham, and State of Michigan, have invented certain new and useful Improvements in Universal Joints, of which the following is a specification.

My invention relates to improvements in universal joints, especially adapted for use on power shafts of automobiles, motorcycles and the like, and has for its object the provision of an improved construction of this character arranged and adapted to prevent sudden jars and shocks in application of the power, the present invention constituting an improvement over that disclosed in my prior application, No. 323,318, filed September 12, 1919.

Other objects will appear hereinafter.

The invention consists in the combinations and arrangements of parts hereinafter described and claimed.

Figure 1:
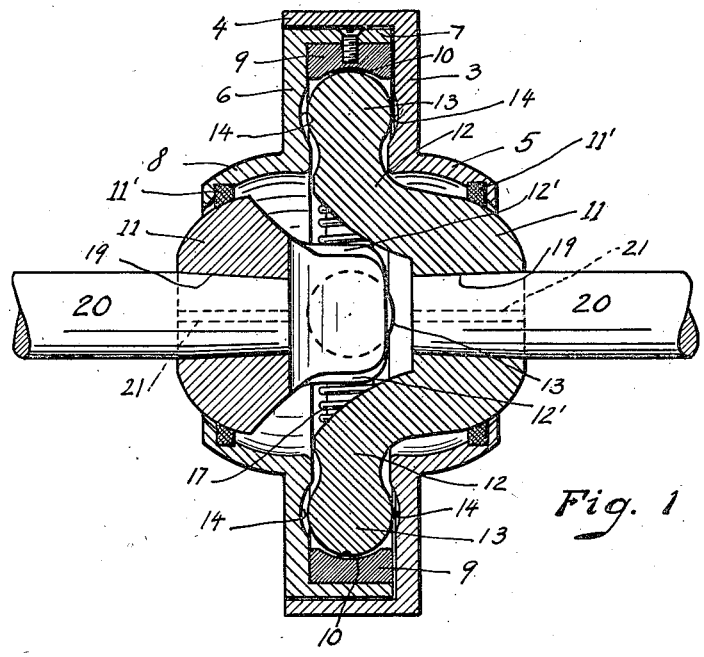
Figure 2:
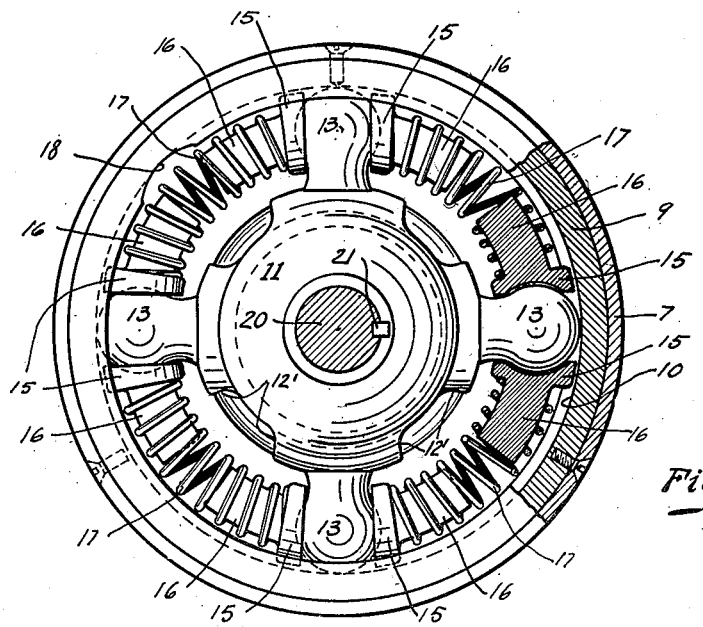

The invention will be best understood by reference to the accompanying drawings forming a part of this specification, and in which, Fig. 1 is a vertical section of a construction embodying the invention, and Fig. 2 is a face view thereof with one side of the casing removed and shown partially in section.

The preferred form of construction as illustrated in the drawings, comprises a ring 3 having an outer circumferential laterally extending flange 4 and a central substantially spherical hub 5. Co-operating with the ring 3 is a similar ring 6 having an outer circumferential laterally extending flange 7 and a central substantially spherical hub 8, the flange 7, being adapted and arranged to fit within the flange 4 to form an outer annular circumferential chamber open at its inner side. A bearing ring 9 is arranged within the flange 7 and secured therein by suitable screws, the said bearing ring constituting the outer wall of said chamber and being provided with a central annular bearing groove 10 as shown.

Yokes are arranged within the hubs of the respective rings 3 and 6. Each of these yokes comprises a central substantially spherical hub 11 fitted within the corresponding ring hub and provided with two radiating arms 12 projecting into the said annular chamber. Each of the arms 12 is provided at its outer end with a ball head 13 fitting within the bearing groove 10 in ring 9 and additional annular bearing grooves 14 being provided in rings 3 and 6 as shown, said ball heads also fitting said grooves 14. Cylindrical bearing blocks 15 are arranged on opposite sides of each of the ball heads 13 being concaved or dished to fit the same, said bearing blocks also fitting the guide grooves 10 and 14 as indicated. Each of the bearing blocks 15 is provided with a circumferentially extending stop and guide plug 16 and a coiled wire spring 17 is positioned between each pair of blocks 15 and with the lugs 16 projecting into said springs as shown, said lugs thus constituting proper guides for the springs and also constituting stop lugs to prevent overstraining of said springs, said lugs being arranged to contact before the limit of elasticity of the springs is reached. The ring 10 is provided with an entry notch 18 to facilitate assembling of parts and particularly the insertion of the ball heads 13 into the groove 10. Felt grease rings 11' are arranged in hubs 5 and 8 to contact with the yoke hubs 11 and adjacent sides or shoulders 12' of the arms 12 are radially formed or "squared" to contact solidly in case of failure and breakage of the parts between.

Each of the hubs 11 is provided with a tapered bore 19 adapted to receive tapered shaft ends 20 which are secured therein by means of keys 21 as shown.

The parts are assembled by first placing the ring 9 within the flange 7 and securing the same in place. Then the yokes are inserted as indicated, the notch 18 permitting such insertion. Then the bearing blocks 15 are assembled with a corresponding spring 17 and inserted between each pair of ball heads 13, thus positioning the yokes 11 at substantially right angles to each other and forming a universal joint. Then the ring 3 is placed in position and the device is then ready for attachment to the shaft ends to constitute a universal joint connection between them. By this arrangement, upon application of power to one of the shaft ends, said power will be transmitted to the other shaft end through the medium of the springs 17, thus effecting a torsionally yielding connection between said shafts which tends to lessen the shocks and jars incident to the application of power, as in automobiles, motor cycles, and the like, and tending to increase the smoothness with which such vehicles may be operated and also tending to diminish the danger of stripping the gears of the transmission therein. The specific form and arrangement of parts disclosed is a simple and effective one for the purpose, capable of economical manufacture in quantities, and which may be readily assembled or taken apart for repairs. The grooves in the casing holds the parts in place during normal operation thereof, and also in case of a breakage. In case of wear between the ball heads 13 and the bearing blocks 15, such wear is automatically taken up by the tension in the springs 17. The joint formed is a "floating joint" having no definite position of use and thus may be readily assembled and will automatically adjust itself to varying conditions in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A universal joint for power shafts comprising a casing having an angular chamber therein, said chamber being open at its inner side; a bearing ring arranged in said chamber and forming the outer wall thereof, said ring and side walls of said chamber being provided with annular grooves; yokes having arms projecting into said chamber; ball heads on the outer ends of said arms fitting in the grooves of said bearing ring and in the walls of said chamber; means for securing shaft ends to said yokes; bearing blocks in said chamber on the opposite sides of each of said ball heads, said bearing blocks fitting the grooves in said walls of said chamber and being arranged to fit said ball heads; and coiled springs in said chamber embracing plugs on said blocks, substantially as described.

2. A universal joint for power shafts comprising a pair of members, each provided with a central substantially spherical hub and with an outer circumferential flange, said flanges interfitting to form an outer circumferential annular chamber; yokes having substantially spherical hubs fitting within the hubs on said members, and having arms provided with ball heads projecting into said annular chamber; means for securing shaft ends to said yokes; bearing blocks in said chamber on opposite sides of each of said heads; and springs in said chamber between said blocks, substantially as described.

3. A universal joint for power shafts comprising a casing having an annular chamber therein, said chamber being open at its inner side and being provided with annular grooves in the outer and side walls thereof; yokes having arms projecting into said chamber; ball heads on the outer ends of said arms fitting the grooves in the walls of said chamber; means for securing shaft ends to said yokes; substantially cylindrical bearing blocks in said chamber on the opposite sides of each of said ball heads, said bearing blocks fitting the grooves in the walls of said chamber and being concave to fit said ball heads; and coiled springs in said chamber between said blocks, said blocks carrying stop plugs projecting into said springs, substantially as described.

4. A universal joint for power shafts comprising a pair of rings each provided with a central substantially spherical hub and with an outer circumferential flange, said flanges interfitting to form an outer circumferential annular chamber; a ring arranged in said chamber to constitute the outer wall thereof, said ring and the side walls of said chamber being provided with annular grooves; yokes having substantially spherical hubs fitting within said hubs on said rings; two radiating arms on each of said yokes projecting into said annular chamber; ball heads on the outer ends of said arms fitting the grooves in the walls of said chamber, the ring constituting the outer wall of said chamber being notched at one side to permit insertion of said heads; substantially cylindrical bearing blocks within said chamber on the opposite sides of each of said ball heads, said bearing blocks fitting the grooves and the walls of said chamber and being concave to fit said ball heads; coiled springs in said chamber interposed between said bearing blocks, said bearing blocks carrying stop plugs projecting into said springs; and means for securing shaft ends to the hubs of said yokes, substantially as described.

In testimony whereof I have signed my name to this specification in the presence of two subscribing witnesses.

WALTER R. WOODS.

Witnesses:
W. W. BAXTER,
BEN E. SCHMOKER.